March 8, 1960 ZEN ITI KIYASU ET AL 2,928,053

APPARATUS FOR THE BINARY DIGITAL CODING OF ELECTRIC SIGNALS

Filed July 17, 1956 3 Sheets-Sheet 1

March 8, 1960 ZEN ITI KIYASU ET AL 2,928,053

APPARATUS FOR THE BINARY DIGITAL CODING OF ELECTRIC SIGNALS

Filed July 17, 1956 3 Sheets-Sheet 2

March 8, 1960 ZEN ITI KIYASU ET AL 2,928,053

APPARATUS FOR THE BINARY DIGITAL CODING OF ELECTRIC SIGNALS

Filed July 17, 1956 3 Sheets-Sheet 3

United States Patent Office 2,928,053
Patented Mar. 8, 1960

2,928,053

APPARATUS FOR THE BINARY DIGITAL CODING OF ELECTRIC SIGNALS

Zen Iti Kiyasu, Nerima-ku, Tokyo-to, Hidero Uno, Nakano-ku, Tokyo-to, Shintaro Oshima, Musashino-shi, Tokyo-to, and Hajime Enomoto, Ichikawa-shi, Chiba-ken, Japan, assignors to Kokusai Denshin Denwa Kabushiki, Kaisha, Tokyo-to, Japan Application July 17, 1956, Serial No. 598,424

Claims priority, application Japan July 19, 1955

7 Claims. (Cl. 332—11)

This invention relates to an apparatus for coding electric input signals by means of binary digital system.

An essential object of this invention is to provide an improved apparatus for the binary digital coding in a pulse-code modulation system or in an electric digital computer.

According to this invention, binary digital coding of electric signals has been attained by using control signals the phases of which are modulated in accordance with the input signal waves by means of utilization of the physical property that phase of oscillation output wave of a parametrically excited resonator takes only either one of two different phases which differ 180° each other and the phase of said output wave is determined in accordance with the phase of control wave, oscillation principle of said resonator being described in the latter in connection with Figs. 1A and 1B.

An apparatus which utilizes pulse-code modulation system has been proposed as a most ideal apparatus for the electric communication, but it is necessary to encode electric signals for the purpose of embodying said apparatus. In any electric computer also, it is necessary to encode various analogous data in order to introduce said data into the digital computer for carrying out electric counting.

It has been conventional to carry out coding of electric signals by converting amplitudes of the input signals to impulse signals by means of coding tube or level selector.

Differing from the above-mentioned apparatuses, this invention utilizes the physical property of the parametrically excited resonator and the principle of phase modulator to encode electric signals.

The novel features of this invention are set forth with particularity in the appended claims. This invention, however, both as to its construction and operation together with further objects and advantages thereof, may best be understood by reference to the following description, taken in connection with the accompanying drawings, in which:

Oscillation principle of the parametrically excited resonator is described herewith before description of this invention.

Figure 1A:
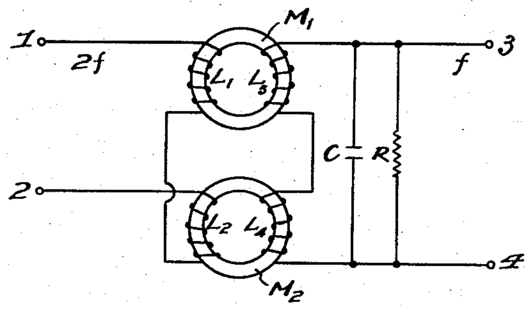
Fig. 1A is a connection diagram of an example of parametrically excited resonator.

In Fig. 1A, in which one embodiment of a parametrically excited resonator to be used as an unit element of the apparatus of this invention is shown, each of two toroidal magnetic cores $M_1$ and $M_2$ is made of ferro-magnetic material such as copper-zinc ferrite. On one ferro-magnetic core $M_1$ are wound a primary coil $L_1$ and a secondary coil $L_3$ and on another ferro-magnetic core $M_2$ are wound a primary coil $L_2$ and a secondary coil $L_4$.

The coils $L_3$ and $L_4$ are connected in series to the output terminals 3 and 4 and the other coils $L_1$ and $L_2$ are connected in series, with reverse polarities, to the input terminals 1 and 2 so that the input voltage supplied to the input terminals 1 and 2 may not induce any voltage to the output terminals 3 and 4. A condenser C is connected in parallel to the secondary circuit composed of the secondary coils $L_3$ and $L_4$ to form a resonance circuit.

A damping resistance R is connected in parallel to the condenser C, but it may be, if necessary, omitted.

Figure 1B:
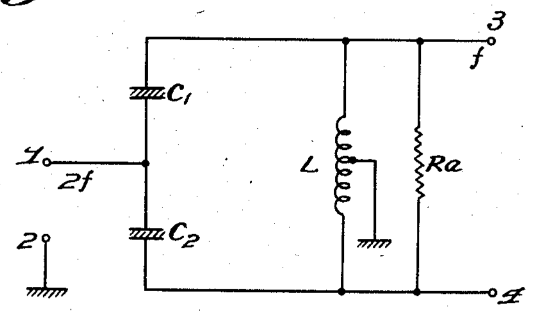
Fig. 1B is a connection diagram of another parametrically excited resonator.

In Fig. 1B is shown another example of the parametrically excited resonator, in which the resonance circuit is formed by parallel connection of two ferro-electric condensers $C_1$ and $C_2$ which are connected in series, an inductance coil L and a damping resistance R*a*, said circuit having input terminals 1 and 2 and output terminals 3 and 4.

Figures 2A, 2B:
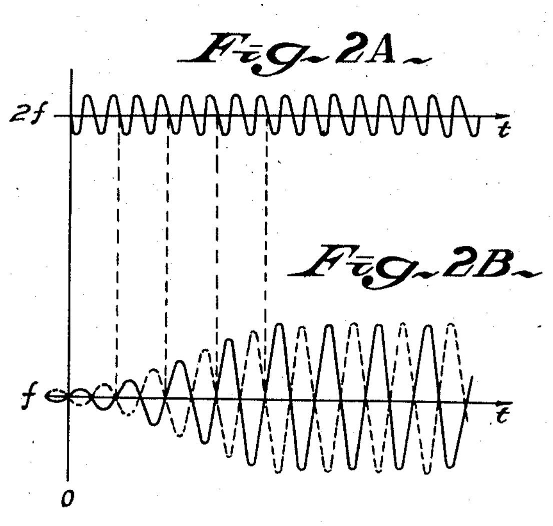
Figs. 2A, 2B and 2C are wave forms and vector diagram for the description of the principle of the parametrically excited resonator.

When such an exciting current having a frequency $2f$ as shown in Fig. 2A is supplied to the input terminals 1 and 2 together with a superposed direct current and resonance frequency of the parametrically excited resonator is nearly equal to $f$, either one of two kinds of the output oscillation currents the frequencies of said currents being $f$ and the phases of said currents being different by 180° each other, can be led out from the output terminals 3 and 4, said both kinds of the output oscillation currents being shown by such full line and broken line as shown in Fig. 2B.

Figure 2C:
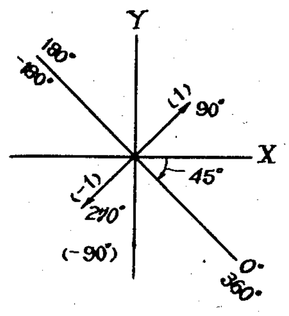

The phase of said output current has a definite relation to the phase of the control current having a frequency $f$ which is supplied to said resonance circuit at the initial period of the oscillation thereof. The phase relation between the exciting current having a frequency $2f$ and said output oscillation current having a frequency $f$ becomes as shown in Figs. 2A and 2B, said phase relation being described more understandably in connection with the vector diagram in Fig. 2C. In Fig. 2C, taking the phase which lags by 45° from the standard phase X of the exciting current as 0°, when the phase of the control current is within the range 0°∼180° or 180°∼360°, the oscillation current takes, respectively, the vector (1) having an angle of 90° or the vector (−1) having an angle of 270° due to "pulling" phenomenon.

Binary digital coding of electric signals in this invention is based on the above-mentioned physical property of the parametrically excited resonator and on the fact that if a frequency of any electric signal is doubled, the phase angle of said signal is doubled also.

Figure 3:
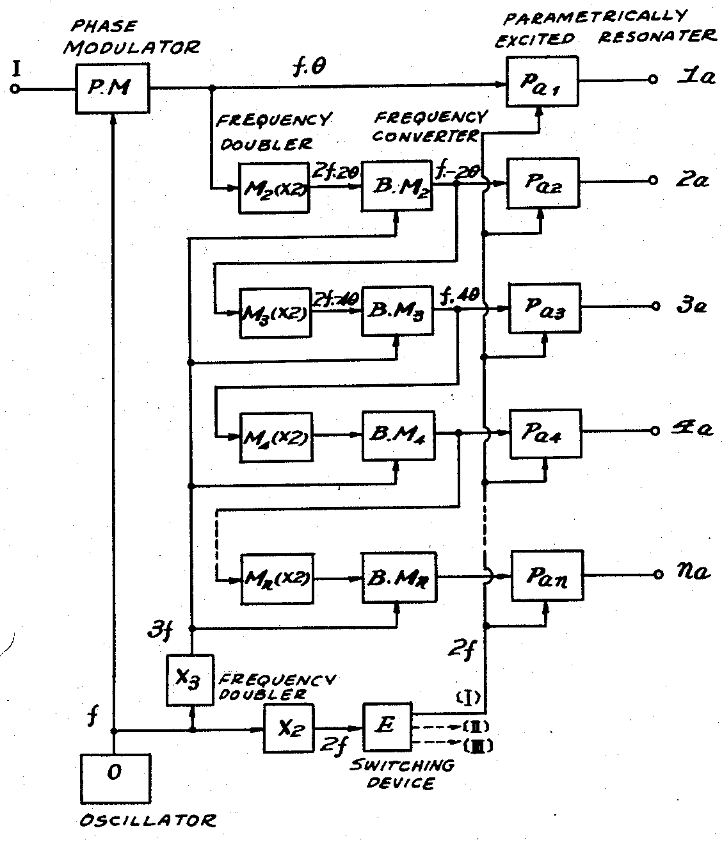
Fig. 3 is a schematic connection diagram of an example of this invention.

The example in Fig. 3 consists of a phase modulator P.M., frequency doubler $M_2, M_3 \ldots M_n$, frequency converters $B.M_2, B.M_3 \ldots B.M_n$, parametrically excited resonators $Pa_1, Pa_2 \ldots Pa_n$, an oscillator O having an oscillation frequency $f$ which is nearly equal to the resonance frequency of said resonators, a frequency doubler $X_2$ for converting the current having a frequency $f$ at the output side of the oscillator O to an exciting current having a frequency $2f$, a switching device E which sends out the exciting current having a frequency $2f$ successively through the lines (I), (II) and (III), and a frequency tripler $X_3$ for converting the current having a frequency $f$ at the output side of the oscillator O to an output current having a frequency $3f$ which is to be supplied to each of frequency converters $B.M_2$, $B.M_3$ . . . $B.M_n$.

In the apparatus in Fig. 3, when an electric continuous signal or samples of signals which are supplied to the input terminal I are introduced in the phase modulator P.M. to modulate the phase of output current of the oscillator O in accordance with amplitude or amplitudes of said signal or signals, a part of said modulated output current having a frequency $f$ is directly supplied to the parametrically excited resonator $Pa_1$ as a control signal to control the phase of oscillation current of said resonator. Then, as described already in connection with Fig. 2C, an output oscillation current the vector angle of which is 90° (direction (1) in Fig. 2C) is led out from the output terminal $1a$ in the case that the phase angle $\theta$ of said control current is within the range 0°∼180°, and an output oscillation current the vector angle of which is —90° (direction (—1) in Fig. 2C) is led out from said terminal $1a$ in the case that said phase angle $\theta$ is within the range 180°∼360°. Accordingly, it is possible to determine the most significant binary digit of the input signal by detecting the phase of the output current having a frequency $f$ which is led out from the terminal $1a$, that is, by detecting the vector angle of said output current.

Next, when a part of the output current of the phase modulator P.M., said output current having a frequency $f$ and a phase angle $\theta$ is supplied to the frequency doubler $M_2$, the output voltage of said doubler becomes the one having a frequency $2f$ and a phase angle $2\theta$. Now, if the just said output voltage is supplied to the frequency converter $B.M_2$ which is fed by a part of the output voltage of the tripler $X_3$, frequency of the just said voltage being $3f$, output voltage of the frequency converter $B.M_2$ becomes the one having a difference frequency $f$ and a phase angle $-2\theta$. Theoretically, it is preferable to make an output voltage having a difference frequency $f$ and a phase angle $2\theta$ by feeding the frequency converter $B.M_2$ with a voltage having a frequency $f$ instead of $3f$, but in this case, there is an apprehension that the current having a frequency $f$ leaks. When said output voltage having a frequency $f$ and a phase angle $-2\theta$ is supplied to the parametrically excited resonator $Pa_2$ after phase inversion thereof to a voltage having a phase angle $(180°-2\theta)$ by a suitable means such as a transformer or by a suitable connection of the parametrically excited resonator, an output oscillation current the vector angle of which is 90° (direction (1) in Fig. 2C) is led out from the output terminal $2a$ in the case that the original angle $\theta$ is within the range 0°∼90° or 180°∼270° (—90°∼180°), and an output oscillation current the vector angle of which is —90° or 270° (direction (—1) in Fig. 2C) is led out from said terminal $2a$ in the case that the original angle $\theta$ is within the range 90°∼180° or 270°∼360° (0°∼—90°).

Accordingly, it is possible to determine the second significant binary digit of the input signal by detecting the phase of the output current which is led out from the output terminal $2a$. Furthermore, when an A.C. voltage having a frequency $2f$ and a phase angle $-4\theta$ is produced at the output side of the frequency doubler $M_3$ by supplying a part of the output voltage of the frequency converter $B.M_2$ to the frequency doubler $M_3$ and the thus obtained output voltage of said doubler $M_3$ is supplied to the parametrically excited resonator $Pa_3$ as the control signal thereof after conversion of said output voltage to a control voltage having a frequency $f$ and a phase angle $4\theta$, an output oscillation current the vector angle of which is 90° having a vector (direction (1) in Fig. 2C) is led out from the output terminal $3a$ in the case that the original angle $\theta$ is within the range 0°∼45°, 90°∼135°, 180°∼225° (—135°∼—180°) or 270°∼315° (—45°∼—90°), and an output oscillation current of which vector is —90° or 270° (direction (—1) in Fig. 2C) is led out from said terminal $3a$ in the case that said angle $\theta$ is within the other range than abovementioned ranges. Accordingly, it is possible to determine the third significant binary digit of the input signal by detecting he phase of the output current which is led out from the output terminal $3a$.

It is possible to carry out successive binary coding of the input signals by repeating the same control as described above in connection with the parametrically excited resonators $Pa_4$ . . . $Pa_n$, whereby binary figures corresponding to the desirable digit places can be effectively obtained.

Figure 4:
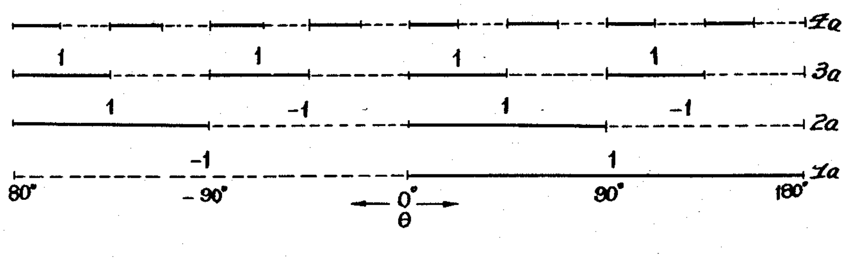
Fig. 4 is a diagram indicating relations between phases of the output waves of four parametrically excited resonators and phase of output signal of the phase modulator in the example of Fig. 3.

The above-mentioned operating relations can be represented by the Table I. In Fig. 4 are shown said relations by phase diagram at the output side of the parametrically excited resonators. When electric precessing is to be carried out by using complement expression, the angle $\theta$ within the range 0°∼—180° can be conveniently used as the complement. On the other hand, when only the phase of output current at the terminal $1a$ is so inverted that vector angle of the oscillation output at said terminal becomes —90° or 270° in the case that the original $\theta$ is within the range 0°∼180° and becomes 90° in the case that said angle $\theta$ is within the range 0°∼—180°, conventional binary coding may be carried out.

*Table I*

| $\theta$ | binary figure at the terminal 1a | $180°-2\theta$ | binary figure at the terminal 2a | $4\theta$ | binary figure at the terminal 3a |
|---|---|---|---|---|---|
| 0°∼45° | 1 | 0°∼90° | 1 | 0°∼180° | 1 |
| 45°∼90° | | 90°∼180° | | 180°∼360° (−180°∼0°) | −1 |
| 90°∼135° | | 180°∼270° (−180°∼−90°) | −1 | 0°∼180° | 1 |
| 135°∼180° | | 270°∼360° (−90°∼0°) | | 180°∼360° (−180°∼0°) | −1 |
| 180°∼225° (−180°∼−135°) | −1 | 0°∼90° | 1 | 0°∼180° | 1 |
| 225°∼270° (−135°∼−90°) | | 90°∼180° | | 180°∼360° (−180°∼0°) | −1 |
| 270°∼315° (−90°∼−45°) | | 180°∼270° (−180°∼−90°) | −1 | 0°∼180° | 1 |
| 315°∼360° (−45°∼0°) | | 270°∼360° (−90°∼0°) | | 180°∼360° (−180°∼0°) | −1 |

The above description relates to only the case of conventional binary digital coding of electric signals.

Figure 5:
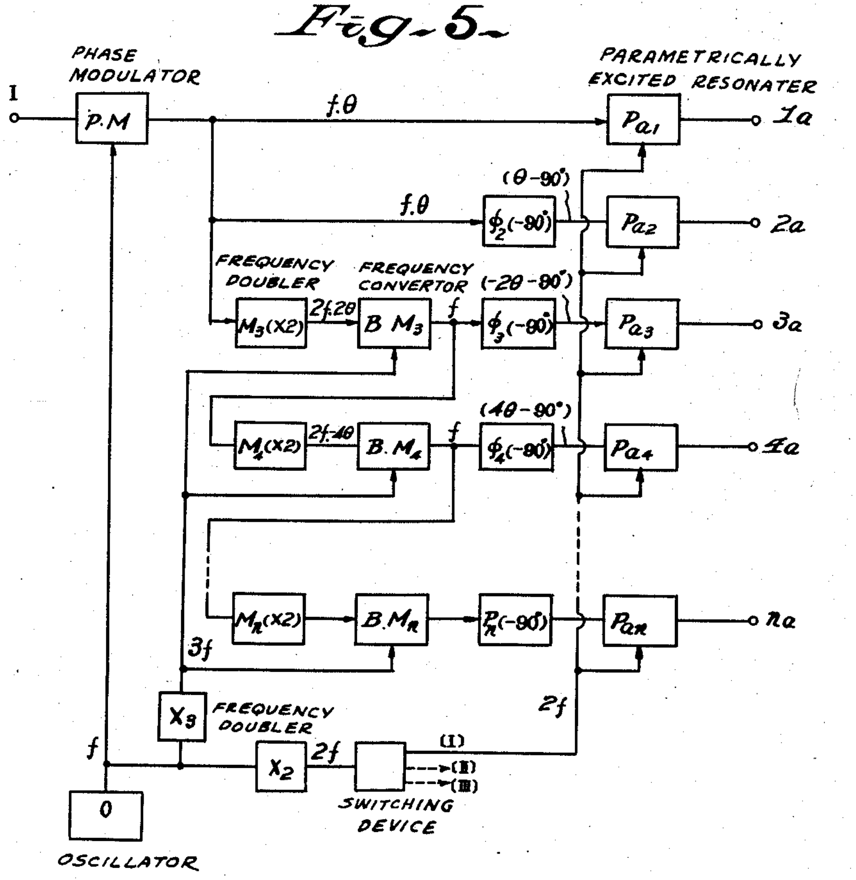
Fig. 5 is a schematic connection diagram of another example of this invention.

However, it is easy to encode electric signals in reflected (Gray) binary codes. Such an example of this invention is schematically shown in Fig. 5, in which the same parts as the Fig. 3 are shown by same marks. In the apparatus in Fig. 5, when the input signal supplied to the input terminal I is first supplied to the phase modulator P.M. so as to produce a control signal current having a frequency $f$ and a phase angle $\theta$ at the output side of said modulator P.M. and the thus produced signal current is directly supplied to the parametrically excited resonator $Pa_1$, an output oscillation current having a vector angle of 90° or −90° is obtained at the output terminal 1$a$ according as the angle $\theta$ is within the range 0°~180° or 180°~360° (0°~−180°). Accordingly, as in the case of the apparatus in Fig. 3, it is possible to determine the most significant binary digit. When a part of output voltage of the phase modulator P.M., frequency and phase angle of said voltage being, respectively, $f$ and $\theta$, is supplied to the parametrically excited resonator $Pa_2$ after conversion of said phase angle $\theta$ to $(\theta-90°)$ by means of a phase shifter $\phi_2$, an output oscillation current having a vector angle of 90° or −90° can be led out from the output terminal 2$a$ according as the angle $\theta$ is within the range 90°~270° (90°~−90°) or 270°~90° (−90°~90°).

By detecting the output current at the output terminal 2$a$ can be obtained the second significant binary digit. Furthermore, determination of the third significant binary digit can be similarly carried out by the following operation. That is to say, when a part of the output voltage of the phase modulator P.M., phase angle of said voltage being $\theta$, is as same as the case in Fig. 3, supplied to the frequency converter $B.M_3$ through a frequency doubler $M_3$ to produce an output voltage having a frequency $f$ and a phase angle $-2\theta$ at the output side of said frequency converter $B.M_3$ and the thus produced output voltage is supplied as the control signal current to the parametrically excited resonator $Pa_3$ after conversion of said phase angle $-2\theta$ to $(-2\theta-90°)$ by means of a phase shifter $\phi_3$, an output oscillation current having a vector angle of 90° or −90° can be led out from the output terminal 3$a$ according as the original angle $\theta$ is within the range 45°~135°, 225°~315° (−135°~−45°) or within the other range. Determination of the fourth significant binary digit can be carried out by the following operation. That is to say, when a part of the output voltage of the frequency converter $B.M_3$, frequency and phase angle of said voltage being, respectively, $f$ and $-2\theta$, is supplied to the frequency converter $B.M_4$ through a frequency doubler $M_4$ to produce an output voltage having a frequency $f$ and a phase $4\theta$ at the output side of said frequency converter $B.M_4$ and the thus produced output voltage is supplied as the control voltage to the parametrically excited resonator $Pa_4$ after conversion of said phase angle $4\theta$ to $(4\theta-90°)$ by means of a phase shifter $\phi_4$ an output oscillation current having a vector angle of 90° or −90° can be led out from the output terminal 4$a$. By detecting the phase angle of the output current at the output terminal 4$a$ can be determined the fourth significant binary digit.

By repeating the same operations as those of the abovementioned operations can be carried out the successive coding of the reflected (Gray) binary codes.

Figure 6:
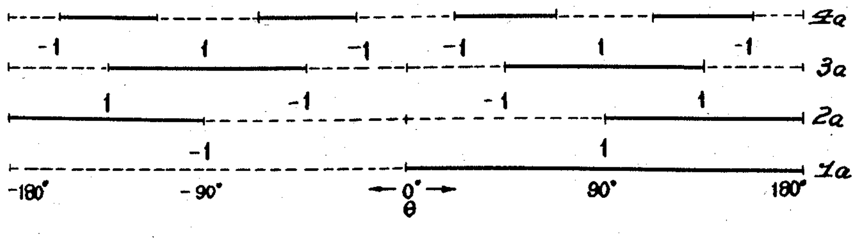
Fig. 6 is a diagram indicating relations between phases of the output waves of the parametrically excited resonators and phase of output signal of the phase modulator in the example of Fig. 5.

The above-mentioned relations are represented by the following Table II or by such phase diagrams at the output side of the parametrically excited resonators as shown in Fig. 6.

*Table II*

<table>
<tr><th>θ</th><th>binary figure at the output terminal 1a</th><th>θ−90°</th><th>binary figure at the output terminal 2a</th><th>−2θ−90°</th><th>binary figure at the output terminal 3a</th></tr>
<tr><td>0°~45°</td><td rowspan="4">1</td><td>−90°~−45°</td><td rowspan="2">−1</td><td>−90°~0°</td><td>−1</td></tr>
<tr><td>45°~90°</td><td>−45°~0°</td><td>0°~90°</td><td rowspan="2">1</td></tr>
<tr><td>90°~135°</td><td>0°~45°</td><td rowspan="4">1</td><td>90°~180°</td></tr>
<tr><td>135°~180°</td><td>45°~90°</td><td>180°~270° (−180°~−90°)</td><td rowspan="2">−1</td></tr>
<tr><td>180°~225° (−180°~−135°)</td><td rowspan="4">−1</td><td>90°~135°</td><td>270°~360° (−90°~0°)</td></tr>
<tr><td>225°~270° (−135°~−90°)</td><td>135°~180°</td><td>0°~90°</td><td rowspan="2">1</td></tr>
<tr><td>270°~315° (−90°~−45°)</td><td>180°~225° (−180°~−135°)</td><td rowspan="2">−1</td><td>90°~180°</td></tr>
<tr><td>315°~360° (−45°~0°)</td><td>225°~270° (−135°~−90°)</td><td>180°~270° (−180°~−90°)</td><td>−1</td></tr>
</table>

While it has been described and shown particular embodiments of this invention, it will, of course, be understood that it would not be limited hereto, since many modifications may be made and this invention, therefore, contemplated by the appended claims to cover all such modifications as fall within the true spirit and scope of this invention.

What we claim is:

1. In an apparatus for the binary digital coding of electric signals, the combination of means for producing a first kind of control signal having a phase modulated according to input signal waves; means for producing a second kind of control signals, each of said signals having a frequency which is equal to that of the control signal of the first kind and having a phase angle which is an integral multiple of the phase angle of the control signals of the first kind; parametrically excited resonators; means supplying said both kinds of the control signals to said resonators; and means for the detection of the oscillation output of each of the above-mentioned resonators, the binary digital coding of the input signals being carried out by said detection.

2. In an apparatus for the binary digital coding of electric signals, the combination of means for producing a first kind of control signal having a phase modulated according to input signal waves; means for producing a second kind of control signals, each of said signals having a frequency which is equal to that of the control signal of the first kind and having a phase angle which is an integral multiple of the phase angle of control signal of the first kind, said means consisting of frequency doublers and frequency converters; parametrically excited resonators; means for supplying said both kinds of the control signals to said resonators; and means for detecting the oscillation output of each of the above-mentioned resonators, the binary digital coding of the input signals being carried out by said detection.

3. In an apparatus for the binary digital coding of electric signals, the combination of means for producing a first kind of control signal having a phase modulated according to input signal waves; means for producing a second kind of control signals, each of said signals having a frequency which is equal to that of the control signal of the first kind and having a phase angle which is an integral multiple of the phase angle of the control signal of the first kind; parametrically excited resonators; means for supplying said both kinds of the control signals to said resonators; said means being connected so as to obtain reflected binary codes by converting the phase of a part of the control signal of the first kind and by converting the phases of the control signals of the second kind; and means for detecting the oscillation output of each of the above-mentioned resonators, the binary digital coding of the input signals being carried out by said detection.

4. In an apparatus for the binary digital coding of electric signals, the combination of means for producing a first kind of control signal having a phase modulated according to input signal waves; means for producing a second kind of control signals, each of said signals having a frequency which is equal to that of the control signal of the first kind and having a phase angle which is an integral multiple of the phase angle of the control signal of the first kind; parametrically excited resonators, each of said resonators having a magnetic core made of ferro-magnetic material; means for supplying said both kinds of the control signals to said resonators; and means for detecting the oscillation output of each of the above-mentioned resonators, the binary digital coding of the input signals being carried out by said detection.

5. In an apparatus for the binary digital coding of electric signals, the combination of means for producing a first kind of control signal having a phase modulated according to input signal waves; means for producing a second kind of control signals, each of said signals having a frequency which is equal to that of the control signal of the first kind and having a phase angle which is an integral multiple of the phase angle of the control signal of the first kind; parametrically excited resonators, each of said resonators containing ferro-electric condensers as the main elements thereof; means for supplying said both kinds of the control signals to said resonators; and means for detecting the oscillation output of each of the above-mentioned resonator, the binary digital coding of the input signals being carried out by said detection.

6. In an apparatus for the binary digital coding of electric signals, the combination of means for producing a first kind of control signal having a phase modulated according to input signal waves, said input signal waves being a continuous signal wave; means for producing a second kind of control signals, each of said signals having a frequency which is equal to that of the control signal of the first kind and having a phase angle which is an integral multiple of the phase angle of the control signal of the first kind; parametrically excited resonators; means for supplying said both kinds of the control signals to said resonators; and means for detecting the oscillation output of each parametrically excited resonator, the binary digital coding of the input signals being carried out by said detection.

7. In an apparatus for the binary digital coding of electric signals, the combination of means for producing a first kind of control signal having a phase modulated according to input signal waves, said input signals being sampled signal waves; means for producing a second kind of control signals, each of said signals having a frequency which is equal to that of the control signal of the first kind and having a phase angle which is an integral multiple of the phase angle of the control signal of the first kind; parametrically excited resonators; means for supplying said both kinds of control signals to said resonators; and means for detecting the oscillation output of each of the above-mentioned resonator, the binary digital coding being carried out by said detection.

References Cited in the file of this patent

UNITED STATES PATENTS

| | | |
|---|---|---|
| 1,652,092 | Clement | Dec. 6, 1927 |
| 1,797,746 | Young | Mar. 24, 1931 |
| 1,898,366 | Lewis | Feb. 21, 1933 |
| 1,964,522 | Lewis | June 26, 1934 |
| 1,978,818 | Roosenstein | Oct. 30, 1934 |
| 2,523,222 | Marks | Sept. 9, 1950 |
| 2,572,958 | Spacek | Oct. 30, 1951 |
| 2,793,360 | Beaumont | May 21, 1957 |
| 2,815,488 | Von Neumann | Dec. 3, 1957 |